United States Patent [19]
Whitehouse

[11] Patent Number: 5,871,706
[45] Date of Patent: Feb. 16, 1999

[54] CARBON BLACK COMPOSITIONS AND IMPROVED POLYMERS COMPOSITIONS

[75] Inventor: Robert S. Whitehouse, Lexington, Mass.

[73] Assignee: Cabot Corporation, Boston, Mass.

[21] Appl. No.: 939,957

[22] Filed: Sep. 29, 1997

Related U.S. Application Data

[60] Continuation of Ser. No. 460,264, Jun. 2, 1995, abandoned, which is a division of Ser. No. 370,709, Jan. 10, 1995, abandoned.

[51] Int. Cl.$^6$ ........................................ C08K 3/00
[52] U.S. Cl. ................. 423/449.2; 23/314; 423/460; 428/408; 523/215; 524/495; 524/496
[58] Field of Search ................ 23/314; 423/449.2, 423/460; 428/408; 523/215; 524/495, 496

[56] References Cited

U.S. PATENT DOCUMENTS

| | | | |
|---|---|---|---|
| 2,065,371 | 12/1936 | Glaxner ........................................ 134/60 |
| 2,457,962 | 1/1949 | Whaley ........................................ 260/766 |
| 2,511,901 | 6/1950 | Bunn ........................................ 18/48 |
| 2,635,057 | 4/1953 | Jordan ........................................ 106/307 |
| 2,639,225 | 5/1953 | Venuto ........................................ 23/314 |
| 2,850,403 | 9/1958 | Day ........................................ 106/307 |
| 2,908,586 | 10/1959 | Braendle et al. ........................................ 106/307 |
| 2,922,773 | 1/1960 | Coler et al. ........................................ 260/32.6 |
| 3,011,902 | 12/1961 | Jordan ........................................ 106/307 |
| 3,014,810 | 12/1961 | Dybalski et al. ........................................ 106/308 |
| 3,361,702 | 1/1968 | Wartman et al. ........................................ 260/33.2 |
| 3,464,949 | 9/1969 | Wartman et al. ........................................ 260/32.6 |
| 3,565,658 | 2/1971 | Frazier et al. . |
| 3,645,765 | 2/1972 | Frazier et al. . |
| 3,671,476 | 6/1972 | Terai et al. ........................................ 260/23 AR |
| 3,844,809 | 10/1974 | Murray ........................................ 106/475 |
| 4,013,622 | 3/1977 | DeJuneas et al. . |
| 4,102,967 | 7/1978 | Vanderveen et al. . |
| 4,230,501 | 10/1980 | Howard et al. . |
| 4,277,288 | 7/1981 | Lawrence et al. . |
| 4,305,849 | 12/1981 | Kawasaki et al. . |
| 4,397,652 | 8/1983 | Neumann . |
| 4,440,671 | 4/1984 | Turbett . |
| 4,440,807 | 4/1984 | Gunnell . |
| 4,444,948 | 4/1984 | Hochstrasser et al. ........................................ 525/61 |
| 4,569,834 | 2/1986 | West et al. . |
| 4,612,139 | 9/1986 | Kawasaki et al. . |
| 4,682,075 | 7/1987 | Nelson et al. ........................................ 313/466 |
| 4,812,505 | 3/1989 | Topcik . |
| 5,071,891 | 12/1991 | Harrison et al. ........................................ 523/209 |
| 5,168,012 | 12/1992 | Watson et al. . |
| 5,397,807 | 3/1995 | Hitchcock et al. ........................................ 521/76 |

FOREIGN PATENT DOCUMENTS

| | | | |
|---|---|---|---|
| 0709008 | 5/1965 | Canada ........................................ 400/60 |
| 2723488 | 11/1984 | Germany ........................................ H01B 3/30 |
| 51-144430 | 12/1976 | Japan ........................................ C09D 5/00 |
| 52-69950 | 6/1977 | Japan . |
| 52-130481 | 11/1977 | Japan . |
| 55-165934 | 12/1980 | Japan . |
| 58-19811 | 2/1983 | Japan . |
| 61-118499 | 6/1986 | Japan ........................................ C11D 3/14 |
| 62-104936 | 1/1987 | Japan ........................................ B01J 2/06 |
| 1201369 | 8/1989 | Japan ........................................ C09C 1/56 |
| 4 164 901 | 6/1992 | Japan ........................................ C08F 2/44 |
| 937492 | 6/1982 | Russian Federation ........................................ C09C 1/52 |
| 975847 | 11/1964 | United Kingdom . |
| 2029421 | 3/1980 | United Kingdom ........................................ C08K 5/10 |

OTHER PUBLICATIONS

Hollis, Gordon L., *Surfactants Europa: A Directory of Surface Active Agents Available in Europe,* second edition.
International Search Report PCT/US96/00088, mailed Jun. 26, 1996.

*Primary Examiner*—Edward J. Cain

[57] ABSTRACT

Carbon black compositions comprising ethoxylated esters or polyethers and carbon black. The compositions may be produced by incorporating ethoxylated esters or polyethers onto fluffy carbon black in a pelletizing process to produce free flowing, low dust, attrition resistant carbon black pellets which are easily dispersible in most polymeric systems and impart to polymer compositions enhanced rheological and mechanical properties. The polymeric compositions have particular utility as semiconductive compositions or masterbatch compositions.

25 Claims, No Drawings

CARBON BLACK COMPOSITIONS AND IMPROVED POLYMERS COMPOSITIONS

This application is a continuation of application Ser. No. 08/460,264 filed on Jun. 2, 1995, now abandoned, which is a divisional of application Ser. No. 08/370,709 filed on Jan. 10, 1995 abandoned.

FIELD OF THE INVENTION

The present invention relates to carbon black compositions comprising ethoxylated esters or polyethers and carbon black. The compositions may be produced by incorporating ethoxylated esters or polyethers onto fluffly carbon black in a pelletizing process to produce free flowing, low dust, attrition resistant carbon black pellets which are easily dispersible in most polymeric systems and provide enhanced rheological and mechanical properties.

The present invention also relates to polymer compositions which incorporate the carbon black compositions of the present invention.

BACKGROUND OF THE ART

Carbon blacks produced by a furnace process generally have bulk densities ranging from 0.02 to 0.1 gram/cubic centimeter (g/cc) and are generally known as fluffy carbon blacks. Fluffy carbon blacks are generally easy to disperse in liquids, and in some polymeric systems. However, fluffy carbon blacks are generally cohesive and, hence difficult to handle for purposes such as conveying and weighing.

Fluffy carbon blacks are agglomerated by various types of mechanical processes, either in the dry state, or with the aid of a liquid to produce pellets with improved handling characteristics. Common liquid pelletizing agents are oil and water. The process of agglomerating fluffy carbon blacks to form carbon black pellets is generally referred to as pelletizing.

Unfortunately, generally utilized densification or agglomeration (pelletizing) processes have detrimental effects on the dispersion characteristics of the carbon black. Therefore it is recognized in the art that in pelletizing carbon blacks there is a fine balance between acceptable handling characteristics and ease of dispersion.

A process for pelletizing carbon black is disclosed in U.S. Pat. No. 2,065,371 which describes a typical wet pelletization process whereby the fluffy carbon black and a liquid, typically water, are combined and agitated until spherical beads are formed. These beads are then dried to reduce the water content preferably to below 1% to form carbon black pellets.

Prior art patents also disclose the use of binder additives in a wet pelletization process to further improve the pellet handling characteristics.

U.S. Pat. No. 2,850,403 discloses the use of carbohydrates e.g. sugar, molasses, soluble starches, saccharides and lignin derivatives as pellet binders in the range of 0.1% to 0.4%, by weight, based on the dry carbon black. The preferred drying temperature of the wet pellet is disclosed as 150° to 425° C. which together with the residence time is sufficient to carbonize the binder.

U.S. Pat. No. 2,908,586 discloses the use of a rosin emulsion as pellet binders as an alternative to carbohydrates. The preferred level of rosin binder is in the range 0.5% to 2.0%, by weight, based on the dry carbon black.

U.S. Pat. No. 2,639,225 discloses the use of sulphonate and sulphate anionic surfactants as pellet binders at levels of 0.1% to 0.5%, by weight, based on the dry carbon black.

U.S. Pat. No. 3,565,658 discloses the use of a fatty amine ethoxylate non-ionic surfactant where the level of ethoxylation ranges from 2 to 50 moles of ethylene oxide per fatty amine group. The preferred level of surfactant in the pelletizing water is in the range 0.05% to 5%, by weight, based on the dry carbon black.

Similarly, U.S. Pat. No. 3,645,765 discloses the use of a fatty acid or rosin acid ethoxylate, non-ionic surfactant where the level of ethoxylation is 5 to 15 moles ethylene per acid group. The preferred level of addition on the carbon black is in the range 0.1% to 10%, by weight, based on the dry carbon black.

Soviet Union Patent No. 937,492 claims the benefits of using 0.1% to 5%, by weight, based on the dry carbon black, of an aqueous solution of a reaction product generated from urea and an ethoxylated alkylolamide. The preferred level of ethoxylation is 1 to 7 moles of ethylene oxide per alkylolamide molecule.

U.S. Pat. No. 3,844,809 discloses the reduction in pellet dust levels by incorporating 0.4% to 2.5%, by weight, based on the dry carbon black of an aqueous solution containing 0.001% to 0.1%, by weight, of a nonionic surfactant containing randomly repeating poly(ethylene oxide) and poly (dimethyl silicone) groups. Molasses is also included at substantially higher concentration (up to 2%, by weight) as a co-binder and nitric acid (up to 15%, by weight) as an oxidizing source.

The use of carbohydrates, rosin or surface active agents as disclosed in the above patents is focused towards improving pellet handling qualities. The patents do not disclose that the pelletizing treatments affected the performance properties of the carbon black in the final product applications, which are typically rubber orientated.

Japanese Patent No. 1,201,369 discloses the use of a carboxylic acid type amphoteric surfactant in a concentration range 0.001% to 0.1%, by weight, in the pelletizing water to produce carbon black pellets with low adhesion and excellent dispersibility.

U.S. Pat. No. 3,014,810 discloses the benefits of wet pelletizing a range of pigments, including carbon blacks, with a blend of a quaternary ammonium compound and a bis(-2-hydroxyethyl)alkyl amine. Improvements in dispersion rate, viscosity stability and antistatic properties are disclosed for the blend of surface active agents.

Pelletizing with oil, in the presence and absence of water is disclosed in U.S. Pat. No. 2,635,057, U.S. Pat. No. 3,011,902 and U.S. Pat. No. 4,102967 as beneficial in improving the handling properties of carbon black pellets.

Several patents, including U.S. Pat. No. 2,511,901, U.S. Pat. No. 2,457,962, U.S. Pat. No. 4,440,807, U.S. Pat. No. 4,569,834, U.S. Pat. No. 5,168,012 and Japanese Patent No. 77,130,481 disclose polymers in emulsion, organic solvent solutions and in molten form as means of modifying the pellet properties of carbon black.

U.S. Pat. No. 4,277,288 discloses a fluidised granulation process for producing free-flowing dustless pigment granules in the absence of water. The organic component required to produce a dustless granule consists of two components, 5–20 phr of a non-aqueous granulating aid and a non-ionic surfactant for example sorbitan oleate ethoxylate as a second component. The bulk of the disclosure relates to producing free-flowing organic and inorganic pigments, including carbon black.

U.S. Pat. No. 4,397,652 also discloses a process for producing negligible dust preparations of organic dyes and optical brighteners. The process involves the dry blending, between 30° and 80° C., of the dye, or optical brightener, with 2–10%, by weight, of an adhesive selected from the group consisting of polyhydric alcohol (e.g. sorbitol); manitol; manitose; lactose; hydrated dextrose; neopentyl glycol; and polyethylene glycol with a molar mass above 3,000. Also included in the composition is 1–10% of a dusting aid selected from the group consisting of fatty acid ethanolamide; fatty acid amide; alkyl alcohol; substituted phenol; and polyethylene glycol with a molar mass between 200 and 1000.

U.S. Pat. No. 4,230,501 discloses a pigment concentrate, dispersible in plastics, which is prepared by combining 51–85%, by weight, of a pigment and 14–49%, by weight, of a waxy component. The waxy component is disclosed as being predominantly a natural, petroleum or synthetic wax which has been blended with either polyethylene glycol or a hydrocarbon resin to reduce the melt viscosity and allow better incorporation of the pigment.

Polyethylene glycol is previously known as an additive for direct compounding into thermoplastic compositions.

U.S. Pat. No. 4,013,622 discloses the incorporation of 100 to 600 ppm of polyethylene glycol in the molar mass range of 600 to 20,000 (preferably 1300 to 7500) to reduce the breakdown of polyethylene during blown film operations which is observed as gel formation.

U.S. Pat. No. 4,812,505, U.S. Pat. No. 4,440,671 and U.S. Pat. No. 4,305,849 disclose the use of polyethylene glycols in the molar mass range 1,000 to 20,000 as beneficial for reducing the heat and water-treeing characteristics in polyolefin compositions for electrical insulation. Similarly U.S. Pat. No. 4,612,139 extends this concept of water-tree reduction to include the polyethylene glycol in semiconductive polyolefin compositions containing carbon black.

Similar compositions are claimed in German Patent DE 27 23 488 where polyethylene glycol and other mobile additives are disclosed as being beneficial to reduce the interlaminar adhesion between the insulation layer and outer conductive layer in an electric cable construction.

Polyethylene glycol and branched ethoxylate molecules are disclosed as plasticisers for ethylene-acrylic acid copolymers in U.S. Pat. No. 3,361,702.

United Kingdom Patent GB 975,847 discloses the use of polyethylene glycol, or an aliphatic derivative, in an aqueous solution as a means of producing agglomerates of organic rubber chemicals. A dough is formed as an intermediate which is then converted into pellets and dried at low temperatures.

SUMMARY OF THE INVENTION

The present invention comprises carbon black compositions that in their dry form have improved handling characteristics and that impart enhanced performance characteristics to polymer compositions. The carbon black compositions comprise:
carbon black and
0.1% to 50%, preferably 1 to 20%, by weight, of at least one binder selected from at least one of the following groups:
i) an ethoxylated polyhydric alcohol having at least 3 hydroxyl groups per molecule prior to ethoxylation, where the total number of ethylene oxide molecules per polyhydric alcohol is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol varies from 3 to 500 and more preferably varies from 5 to 100;

ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol ester varies from 3 to 500 and more preferably varies from 5 to 100;

iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality; preferably the polyhydric alcohol is selected from the group consisting of: triethanolamine, glycerol, pentaerythritol, sorbitol, sorbitan, sorbitol and a polyglyceride;

iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of: triethanolamine, glycerol, pentaerythritol, sorbitol, sorbitan, sorbitol and a polyglyceride and/or the total number of ethylene oxide molecules per polyhydric alcohol ester varies from 3 to 500 and more preferably varies from 5 to 100;

v) a polyethylene oxide-polypropylene oxide-polyethylene oxide block copolymer.

It is also preferred that the binders of groups i, ii, iii, iv and v have an HLB value of 8.0 to 30.

HLB value refers to hydrophile-lipophile balance value which may be determined by the method described in *Non-Ionic Surfactants Volume* 23, edited by Martin Schick (Marcel Dekker Inc. (New York) 1987; ISBN 0-8247-7530-9), page 440. *Non-Ionic Surfactants Volume* 23 provides equations relating the structure of the surfactant molecule to HLB value. HLB value is also discussed in the following journal articles: Griffin W. C., *J. Soc. Cosmetic Chemistt,* Vol. 1, page 311 et seq. (1949) and Vol. 5, page 249 et seq. (1954). From data relating to the weight percentage of ethylene oxide in the molecule, saponification number of the ester linkage and acid value of the "fatty" acid, HLB value may be directly calculated from one of the following equations:

for polyhydric fatty acid esters:

$$HLB=20(1-S/A)$$ where S=saponification number of the ester and A=acid number of the acid;

and for ethoxylated polyhydric alcohols:

HLB=(E+P)/5, where E=weight of percent ethylene oxide and
P=weight pigment of polyhydric alcohol.

While any carbon black may be utilized in the compositions of the present invention, preferably the carbon black component of the carbon black composition has a nitrogen surface area ($N_2SA$) of 15 to 1800 $m^2/g$, a fluffy dibutyl phthalate absorption value (DBP) of 50 to 350 cc/100 g and a cetyl trimethylammonium bromide absorption value (CTAB) of 15 to 1500 $m^2/g$.

The carbon black compositions may be produced in any manner known in the art, such as by physically blending the components, melt mixing the components or combining the components while pelletizing the carbon black. Preferably the carbon black compositions are obtained by pretreating the carbon black with the binder.

The carbon black compositions may also be produced by a pelletizing process by:

contacting a fluffy carbon black in a pin pelletizer with an aqueous solution containing a binder selected from the foregoing groups of compounds wherein the preferred level of binder in the pelletizing water is from 0.5% to 50%; more preferably 20–40%, by weight; and heating the wet pellets under controlled temperature and time parameters such that the water is removed from the pellets but the binder does not undergo substantial decomposition, and the final binder level on the dry carbon black is from 0.1% to 50%.

The present invention also includes new polymer compositions comprising:

a polymer component and 0.1–65%, preferably 0.1–20%, by weight, of a composition comprising a carbon black and 0.1–50%, preferably 1–20%, of at least one binder component selected from at least one of groups i, ii, iii, iv or v, set forth above. Preferably, the carbon black is pretreated with the binder component. The preferred carbon blacks, and binder components are as set forth above with respect to the carbon black compositions of the present invention. The polymer compositions may include other conventional additives such as pigments, reinforcing agents and the like.

While any polymer may be utilized in the polymer composition of the present invention, preferred polymers for use in the polymer compositions of the present invention include, but are not limited to:

a) homo or copolymers and graft polymers of ethylene where the co-monomers are selected from butene, hexene, propene, octene, vinyl acetate, acrylic acid, methacrylic acid, esters of acrylic acid, esters of methacrylic acid, maleic anhydride, half ester of maleic anhydride, and carbon monoxide;

b) elastomers selected from natural rubber, polybutadiene, polyisoprene, random styrene butadiene rubber (SBR), polychloroprene, acrylonitrile butadiene, ethylene propylene co and terpolymers;

c) homo and copolymers of styrene, including styrene-butadiene-styrene linear and radial polymer, acrylonitrile butadiene styrene (ABS) and styrene acrylonitrile (SAN);

d) linear and branched polyether or polyester polyols;

e) crystalline and amorphous polyesters and polyamides;

f) alkyd resins, rosin acids or rosin esters, hydrocarbon resins produced from thermal or Friedel Crafts polymerization of cyclic diene monomers such as dicyclopentadiene, indene, cumene; and g) hydrocarbon oils such as paraffinic oil, naphthenic oil and hydrogenated naphthenic oil.

The polymer compositions of the present invention may be produced in any manner known to the art for combining polymers and dry or aqueous components.

The present invention further includes articles of manufacture produced from the polymer compositions of the present invention.

For use in semiconductive wire and cable applications, a typical formulation of the present invention preferably comprises:

25–55%, by weight, of a composition comprising carbon black and 0.5 to 10 parts per 100 parts of carbon black of at least one binder component selected from at least one of groups i, ii, iii, iv or v, set forth above;

0 to 2%, by weight a stabilizer or antioxidant 0 to 5%, by weight an organic peroxide, preferably dicumyl peroxide;

0 to 10%, by weight a vinyl silane;

the remainder being a polymer, or a blend of polymers, selected from the following group:

ethylene homopolymer;

ethylene copolymerized with one or more alpha olefins, such as propylene, butene, or hexene;

ethylene copolymerized with propylene and a diene monomer, preferably norbornene; and ethylene copolymer with one or more monomers selected from vinyl acetate, acrylic acid, methacrylic acid, esters of acrylic or methacrylic acid containing 1 to 8 carbon atoms, maleic anhydride or a monoester derived from fumaric or maleic acid, vinyl chloride or vinylidene chloride.

The curable semi-conductive composition of the present invention may additionally include an additive polymer such as acrylonitrile butadiene elastomer containing 25–55%, by weight acrylonitrile.

For use as a masterbatch composition, a typical formulation of the present invention preferably comprises:

30–60%, by weight, of a composition comprising a carbon black and 0.1 to 50%, preferably 1–20%, of at least one binder component selected from at least one of groups 1, ii, iii, iv or v, set forth above; and 70–40%, by weight of an ethylene homopolymer or copolymer, where the comonomer is preferably selected from hexene, propene, butene, octene or vinyl acetate.

Preferably, the polymer composition is polyethylene, low density polyethylene, linear low density polyethylene, high density polyethylene or a polyethylene wax. The masterbatch composition may additionally include antioxidants, peroxide decomposers, hindered amine light stabilizers, substituted benzophenone UV adsorbers or process aids.

An advantage of the carbon black compositions of the present invention is that in dry form the carbon black compositions of the present invention have improved handling properties in comparison with conventional fluffy or pelleted carbon blacks.

An advantage of the polymer compositions of the present invention is that the polymer compositions exhibit enhanced rheological, processing or mechanical properties.

Further advantages of the carbon black compositions, and the polymer compositions, of the present invention will become apparent from the following detailed description.

DETAILED DESCRIPTION OF THE INVENTION

The present invention includes carbon black compositions which in dry form have improved handling characteristics and impart enhanced performance characteristics to polymer compositions.

The carbon black compositions comprise:
carbon black and
0.1% to 50%, preferably 1 to 20%, by weight, of at least one binder selected from at least one of the following groups:
i) an ethoxylated polyhydric alcohol having at least 3 hydroxyl groups per molecule prior to ethoxylation, where the total number of ethylene oxide molecules per polyhydric alcohol is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol varies from 3 to 500 and more preferably varies from 5 to 100;
ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol ester varies from 3 to 500 and more preferably varies from 5 to 100;
iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality; preferably the polyhydric alcohol is selected from the group consisting of: triethanolamine, glycerol, pentaerythritol, sorbitol, sorbitan, sorbitol and a polyglyceride;
iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of: triethanolamine, glycerol, pentaerythritol, sorbitol, sorbitan, sorbitol and a polyglyceride and/or the total number of ethylene oxide molecules per polyhydric alcohol ester varies from 3 to 500 and more preferably varies from 5 to 100;
v) a polyethylene oxide-polypropylene oxide-polyethylene oxide block copolymer.

It is also preferred that the binders of groups i, ii, iii, iv and v have an HLB value of 8.0 to 30. HLB value may be determined in the manner set forth above.

While any carbon black may be utilized in the compositions of the present invention, preferably the carbon black component of the carbon black composition has a nitrogen surface area ($N_2SA$) of 15 to 1800 $m^2/g$, a fluffy dibutyl phthalate absorption value (DBP) of 50 to 350 cc/100 g and a cetyl triamethylammonium bromide absorption value (CTAB) of 15 to 1500 $m^2/g$.

The carbon black compositions may be produced by any conventional technique for combining carbon black with dry or aqueous components. Preferably the carbon black compositions are produced by pretreating the carbon black with the binder. The carbon black compositions may be produced, in dry form, by a conventional pelletizing process. For example, the carbon black compositions of the present invention may be produced by contacting a fluffy carbon black in a pin pelletizer with an aqueous solution containing a binder selected from the foregoing groups of compounds wherein the level of binder in the pelletizing water is from 0.5% to 50%; and heating the wet pellets under controlled temperature and time parameters such that the water is removed from the pellets but the binder does not undergo substantial decomposition, and the final binder level on the dry carbon black is from 0.1% to 40%. The preparation of aqueous solutions containing the binder compositions used in the present invention is within the skill of one of ordinary skill in the art.

Pin pelletizers which may be utilized to produce the compositions of the present invention are known in the art and include the pin pelletizer described in U.S. Pat. No. 3,528,785, the disclosure of which is hereby incorporated by reference. U.S. Pat. No. 3,528,785 also describes a conventional pelletizing process which may be utilized to produce the compositions of the present invention.

The present invention also includes new polymer compositions comprising:
a polymer component and 0.1–65%, preferably 0.1–20%, by weight, of a composition comprising a carbon black and 0.1–50%, preferably 1–20%, of at least one binder selected from at least one of the following groups:
i) an ethoxylated polyhydric alcohol having at least 3 hydroxyl groups per molecule prior to ethoxylation, where the total number of ethylene oxide molecules per polyhydric alcohol is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol varies from 3 to 500 and more preferably varies from 5 to 100;
ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80%lo with the remainder being a di-ester functionality, and further where the number of ethylene oxide molecules per polyhydric alcohol ester is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol ester varies from 3 to 500 and more preferably varies from 5 to 100;
iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality; preferably the polyhydric alcohol is selected from the group consisting of: triethanolamine, glycerol, pentaerythritol, sorbitol, sorbitan, sorbitol and a polyglyceride;

iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of: triethanolamine, glycerol, pentaerythritol, sorbitol, sorbitan, sorbitol and a polyglyceride and/or the total number of ethylene oxide molecules per polyhydric alcohol ester varies from 3 to 500 and more preferably varies from 5 to 100;

v) a polyethylene oxide-polypropylene oxide-polyethylene oxide block copolymer. Preferably, the carbon black is pretreated with the binder component. The preferred carbon blacks, and binder components are as set forth above with respect to the carbon black compositions of the present invention. For example, it is preferred that the binder component have an HLB value of 8.0 to 30. The polymer compositions may include other conventional additives such as pigments, reinforcing agents and the like.

While any polymer may be utilized in the polymer composition of the present invention, preferred polymers for use in the polymer compositions of the present invention include, but are not limited to:

a) homo or copolymers and graft polymers of ethylene where the co-monomers are selected from butene, hexene, propene, octene, vinyl acetate, acrylic acid, methacrylic acid, esters of acrylic acid, esters of methacrylic acid, maleic anhydride, half ester of maleic anhydride, and carbon monoxide;

b) elastomers selected from natural rubber, polybutadiene, polyisoprene, random styrene butadiene rubber (SBR), polychloroprene, acrylonitrile butadiene, ethylene propylene co and terpolymers;

c) homo and copolymers of styrene, including styrene-butadiene-styrene linear and radial polymer, acrylonitrile butadiene styrene (ABS) and styrene acrylonitrile (SAN);

d) linear and branched polyether or polyester polyols;

e) crystalline and amorphous polyesters and polyamides;

f) alkyd resins, rosin acids or rosin esters, hydrocarbon resins produced from thermal or Friedel Crafts polymerization of cyclic diene monomers such as dicyclopentadiene, indene, cumene; and g) hydrocarbon oils such as parafinic oil, naphthenic oil and hydrogenated naphthenic oil.

The polymer compositions of the present invention may be produced in any manner known to the art for combining polymers and dry or aqueous components.

The present invention further includes articles of manufacture produced from the polymer compositions of the present invention.

For use in semiconductive wire and cable applications, a typical formulation of the present invention comprises:

25–55%, by weight, of a composition comprising a carbon black and 0.5 to 10 parts, per 100 parts of carbon black, of at least one binder selected from at least one of the following groups:

i) an ethoxylated polyhydric alcohol having at least 3 hydroxyl groups per molecule prior to ethoxylation, where the total number of ethylene oxide molecules per polyhydric alcohol is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol varies from 3 to 500 and more preferably varies from 5 to 100;

ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of triethanolamine, glycerol, pentaerythritol, sorbitol, sorbitan, sucrose or a polyglyceride and/or the total number of ethylene oxide molecules per polyhydric alcohol ester varies from 3 to 500 and more preferably varies from 5 to 100;

iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality; preferably the polyhydric alcohol is selected from the group consisting of: triethanolamine, glycerol, pentaerythritol, sorbitol, sorbitan, sorbitol and a polyglyceride;

iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3; preferably the polyhydric alcohol is selected from the group consisting of: triethanolamine, glycerol, pentaerythritol, sorbitol, sorbitan, sorbitol and a polyglyceride and/or the total number of ethylene oxide molecules per polyhydric alcohol ester varies from 3 to 500 and more preferably varies from 5 to 100;

v) a polyethylene oxide-polypropylene oxide-polyethylene oxide block copolymer;

0 to 2%, by weight a stabilizer or antioxidant;

0 to 5%, by weight an organic peroxide, preferably dicumyl peroxide;

0 to 10%, by weight a vinyl silane;

the remainder being a polymer, or a blend of polymers, selected from the following group:

ethylene homopolymer;

ethylene copolymerized with one or more alpha olefins, such as propylene, butene, or hexene;

ethylene copolymerized with propylene and a diene monomer, preferably norbomene; and ethylene copolymer with one or more monomers selected from vinyl acetate, acrylic acid, methacrylic acid, esters of acrylic or methacrylic acid containing 1 to 8 carbon atoms, maleic anhydride or a monoester derived from fumaric or maleic acid, vinyl chloride or vinylidene chloride.

The curable semi-conductive composition of the present invention may additionally include an additive polymer such as acrylonitrile butadiene elastomer containing 25–55%, by weight acrylonitrile.

For use as a masterbatch composition, a typical formulation of the present invention preferably comprises:

70–40%, by weight of an ethylene homopolymer or copolymer, where the comonomer is preferably selected from hexene, propene, butene, octene or vinyl acetate; and 30–60%, by weight, of a composition comprising a carbon black and 0.1 to 50%, preferably 1–20%, a binder component selected from at least one of the following groups:
  i) an ethoxylated polyhydric alcohol having at least 3 hydroxyl groups per molecule prior to ethoxylation, where the polyhydric alcohol is preferably selected from the group consisting of triethanolamine, glycerol, pentaerythritol, sorbitol, sorbitan, sucrose or a polyglyceride and where the total number of ethylene oxide molecules per polyhydric alcohol is at least 3, preferably varies from 3 to 500, more preferably varies from 5 to 100;
  ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3, preferably varies from 3 to 500, more preferably varies from 5 to 100, and where the polyhydric alcohol is preferably selected from the group consisting of triethanolamine, glycerol, pentaerythritol, sorbitol, sorbitan, sucrose or a polyglyceride;
  iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and where the polyhydric alcohol is preferably selected from the group consisting of: triethanolamine, glycerol, pentaerythritol, sorbitol, sorbitan, sorbitol and a polyglyceride;
  iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol ester is at least 3, preferably varies from 3 to 500, more preferably varies from 5 to 100, and where the polyhydric alcohol is preferably selected from the group consisting of: triethanolamine, glycerol, pentaerythritol, sorbitol, sorbitan, sorbitol and a polyglyceride;
  v) a polyethylene oxide-polypropylene oxide-polyethylene oxide block copolymer. Preferably, the polymer composition is polyethylene, low density polyethylene, linear low density polyethylene, high density polyethylene or a polyethylene wax. The masterbatch composition may additionally include antioxidants, peroxide decomposers, hindered amine light stabilizers, substituted benzophenone UV adsorbers or process aids.

The effectiveness and advantages of various aspects and embodiments of the present invention will be further illustrated by the following examples wherein the following testing procedures were utilized.

The following testing procedures were utilized in the determination and evaluation of the analytical properties of the carbon blacks utilized in the following examples. The DBP (dibutyl phthalate adsorption value) of the carbon blacks utilized in the examples, expressed as cubic centimeters DBP per 100 grams carbon black (cc/100 g), was determined according to the procedure set forth in ASTM D2414. The nitrogen surface area ($N_2SA$) of the carbon blacks utilized in the examples, expressed as square meters per gram ($m^2/g$), was determined according to ASTM test procedure D3037 Method A.

The carbon blacks pellets described in the following examples were evaluated utilizing the following testing procedures. The pellets were assessed for mass pellet strength using ASTM D 1937. Pellet attrition was evaluated using a modified version of ASTM D 4324, wherein the ASTM test procedure was modified to generate the level of dust after shaking samples for 5 minutes.

The moisture content of the pellets was determined by drying the sample to constant mass in an air circulating oven at 150° C. and then calculating moisture percentage by comparing the weight prior to drying to the weight after drying.

The polymer compositions, including the polymer masterbatch compositions, described in the following examples were evaluated utilizing the following test procedures.

Melt index was determined by ASTM D1238.

Pressure rise of the masterbatch compositions was determined by introducing a 325 mesh screen pack behind the breaker plate of a 1 inch single screw extruder fitted with a pressure transducer to measure the pressure change in the region of the screen pack.

Viscosity of the polymer compositions was measured utilizing a Carri-Med CS viscometer, produced and sold by TA Instruments of Wilmington, Del. at the temperature, and utilizing the shear rate specified in the particular example.

Triple roll mill passes were evaluated by passing the polymer compositions through a triple roll mill and recording the number of passes required to generate zero scratches on a Hegman gauge, and also recording the residual background "sand" value.

Dispersion of the diluted samples in the following examples was determed by diluting the masterbatch composition down to a loading of 2%, by weight, carbon black with the EVA resin in a Brabender mixer operating at 85° C. and 50 rpm. The mixing time was 2 minutes. Samples were then pressed between microscope slides and dispersion at 100×magnification was determined by the Cabot Corporation rating method wherein the number (1-6) refers to the size of the undispersed particles, with 1 being small and 6 being large; and the letter (A-E) refers to the number of particles per field of view, with A being 1–2 particles and E being greater than 50 particles. Lower numbers and earlier letters indicate better dispersion, with a 1A rating indicating good dispersion and a 6E rating indication poor dispersion.

In Examples 18–26, dispersion of the carbon black pellets was determined by measuring the number and size of surface imperfections in the tape formed from the compound incorporating the pellets using an optical microscope at 100×magnification and a reflected light source.

The polymer compositions were evaluated for strippability utilizing the following technique. The compositions containing 40% carbon black in the ethylene vinyl acetate resin were compounded in a Brabender mixer with 1% dicumyl peroxide while maintaining the mixing temperature below 150° C. The material was transferred to a heated hydraulic press (temperature 130° C.) and a plaque 1.2 mm thick produced. A 2 mm polyethylene plaque containing 1% dicumyl peroxide was produced in a similar manner. The two plaques were laminated together under a pressure of 100 psi and exposed to a curing cycle of 180° C. for 15 minutes. The laminate was allow to cool to ambient temperature under pressure. The delamination force under a peeling angle of 180 degrees and a separation speed of 3.94 inches/minute was recorded; the results provided are an average of 28 peel tests.

The modulus, tensile and elongation of the polymer compositions were measured by the procedure set forth in ASTM D 412.

The Shore A Hardness of the rubber compounds was determined according to the procedure set forth in ASTM D-2240-86.

The maximum torque was determined from the peak of the motor load versus time profile from the Brabender mixer.

The dump torque (Nm) was determined from the final torque value at the end of the mixing cycle.

The total energy (Nm) was determined by calculating from the area under the full mixing curve.

The MDR @ 170° C. T50 (m.m), and T90 (m.m) was determined according to the procedure set forth in ASTM 2084.

The Mooney viscosity (ML(1+4) @ 100° C. (MU)) was determined according to the procedure set forth in ASTM 1646.

The IRHD (hardness) was determined according to the procedure set forth in ASTM D1415.

The effectiveness and advantages of the present invention will be further illustrated by the following examples.

EXAMPLES 1–4

Examples 1–4 illustrate the use and advantages of carbon black compositions of the present invention, in comparison to conventional carbon black pellets, in polypropylene fiber applications.

Four carbon black pellet compositions, A, B, C and D were produced by introducing 400 grams (g) of a fluffy carbon black, identified herein as CB-1, having a DBP of 60 cc/100 g and a nitrogen surface area of 112 m$^2$/g, into a batch pin pelletizer together with a solution containing 20 g of a binder and 300 g of water. The binder utilized in each pelleting composition was as shown in the Table below.

| Pellet Composition | Binder |
|---|---|
| A | water |
| B | 5% sorbitan monostearate with 20 moles ethoxylate |
| C | 5% sorbitan monooleate with 5 moles ethoxylate |
| D | 5% sorbitan monooleate with 20 moles ethoxylate |

Carbon black pellet composition A was a control composition, carbon black pellet compositions B, C and D were carbon black compositions of the present invention.

The carbon black/binder mixture was agitated for 5 minutes with a rotor speed of 800 rpm. The resultant pellets were dried at 120° C. until the moisture content of the pellets was below 0.51. Pellet strength of each pellet composition was assessed qualitatively. The results are set forth in Table 1 below.

The carbon black pellets were combined with a polypropylene homopolymer of melt index 35 in a twin screw extruder to produce a masterbatch containing 35% by weight of the pelleted carbon black, the remainder being polypropylene and binder.

The polypropylene composition was introduced into a 1 inch single screw extruder until equilibrium pressure conditions. The masterbatch was introduced and the rate of pressure change recorded according to the procedure described above. The results were as shown in Table 1 below.

TABLE 1

| Carbon Black Pellet Composition | pellet strength | pressure rise psi/g |
|---|---|---|
| A | weak | 4.86 |
| B | strong | 4.34 |
| C | strong | 4.25 |
| D | strong | 2.97 |

These results indicate that carbon black compositions B, C and D of the present invention have improved pellet strength in comparison with the carbon black pellet composition A produced with pelletizing water only. In addition, the reduction in pressure build-up in masterbatch compositions containing carbon black compositions B, C and D of the present invention, in comparison to the masterbatch composition containing carbon black composition A, would translate to a reduction in the frequency of screen changes on a fiber production line, and therefore improved capacity and lower operating costs for the production line.

EXAMPLES 5–10

Examples 5–10 illustrate the use and advantages of carbon black compositions of the present invention, in comparison to conventional carbon black pellets, in polypropylene fiber applications.

Two carbon black pellet compositions, E and F were produced in a continuous process by combining a fluffy carbon black, identified herein as CB-2, having a DBP of 112 cc/100 g and an nitrogen surface area of 60 m$^2$/g into a batch pin pelletizer together with a binder solution. The pellets were produced in a continuous pin pelletizer operating with rotor speed of 800 rpm to provide wet pellets with an average water content of 50%. The wet pellets were dried in a heated rotating drum to provide dry pellets with a moisture content below 0.6%.

The binder utilized in each pelleting composition was as shown in the Table below.

| Pellet Composition | Binder |
|---|---|
| E | water |
| F | 2% sorbitan monooleate with 20 moles ethoxylate |

Four runs of carbon black pellet composition E, and two runs of carbon black pellet composition F were made. Carbon black pellet composition E was a control composition, and carbon black pellet compositions F was a carbon black composition of the present invention.

The pellets were assessed for mass pellet strength and pellet attrition using the procedures described above. In addition, the pellets were used to produce a masterbatch, as in examples 1–4, and the pressure rise determined as described above. The results are set forth in Table 2 below.

TABLE 2

| Carbon Black Pellet Composition | | pellet strength pounds | dust (%) 5 min. | pressure rise psi/g |
|---|---|---|---|---|
| E | run 1 | 15 | 1.2 | 11.0 |
| E | run 2 | 14 | 1.2 | 11.4 |
| E | run 3 | 16 | 2.8 | 12.9 |
| E | run 4 | 18 | 1.6 | 9.1 |
| F | run 1 | 44 | 0.4 | 7.3 |
| F | run 2 | 58 | 0.2 | 5.3 |

These results illustrate the significant improvement in pellet strength and attrition resistance by incorporation of a binder of the type utilized in the present invention during the pelletizing process in preparing the carbon black pellet composition F of the present invention. Carbon black pellet composition F of the present invention also has improved dispersion, in comparison with a conventional water pelletized carbon black pellet composition E, as seen by the reduction in pressure build-up when extruded through a screen pack which would translate to improved output at lower operating cost.

EXAMPLES 11–14

Examples 11–14 illustrate the advantages of the carbon black pellet compositions of the present invention for use in polyurethane applications.

Two fluffy carbon blacks, identified herein as CB-3 and CB4, were pelletized to produce carbon black pellet compositions. Carbon blacks CB-3 and CB-4 had the combination of analytical properties set forth below:

| Fluffy Carbon Black | DBP | $N_2SA$ |
|---|---|---|
| CB-3 | 112 cc/100 g | 58 $m^2/g$ |
| CB-4 | 140 cc/100 g | 68 $m^2/g$ |

Four carbon black pellet compositions, G, H, I and J were produced in a continous process by combining the carbon blacks in a batch pin pelletizer together with a binder solution. The pellets were produced in a continuous pin pelletizer operating with rotor speed of 1000 rpm and dried in a heated rotating drum to provide dry pellets with a moisture content below 0.3%. The binder and carbon black utilized in each pelleting composition was as shown in the Table below.

| Pellet Composition | Carbon Black | Binder |
|---|---|---|
| G | CB-3 | water |
| H | CB-3 | 2% sorbitan monooleate with 20 moles ethylene oxide |
| I | CB-4 | water |
| J | CB-4 | 2% sorbitan monooleate with 20 moles ethylene oxide |

Carbon black pellet compositions G and I were control compositions, and carbon black pellet compositions H and J were carbon black compositions of the present invention.

The pellets were assessed for mass pellet strength using the procedures described above. The results were as follows:

| Pellet Composition | mass pellet strength - pounds |
|---|---|
| G | 14–16 |
| H | 51 |
| I | 10 |
| J | 26 |

The carbon black pellet compositions G, H, I and J were compounded into a polyether polyol, having a viscosity of 150 mPa.s at 25° C. and a hydroxyl content of 3.4%, to produce a 30% carbon black content paste. In addition, a polyether polyol compositon was produced by compounding carbon black CB4 into the polyol and adding 2% sorbitan monooleate with 20 moles ethylene oxide binder directly to the polyol. Each compounding operation involved pre-dispersion under a high shear, Dispermat, mixer for 5 minutes at a speed of 2000 rpm.

The paste was then transferred to a triple roll mill for the final size reduction process. The number of passes through the triple roll mill required to generate zero scratches on a Hegman gauge were noted together with the residual background "sand" value. The paste was then diluted with further polyol to produce a 15% carbon black loaded sample and the viscosity measured on a Carri-Med CS viscometer at a shear rate of 300 s-1. The results were as shown in Table 3:

TABLE 3

| Carbon Black Pellet Composition | Number of passes triple roll | "sand" (microns) | viscosity shear stress (dyne/$cm^2$) |
|---|---|---|---|
| G | 5 | 37 | 2800 |
| H | 5 | 19 | 1900 |
| I | 6 | 17 | 1860 |
| J | 5 | 17 | 1400 |
| CB-4, with Binder Added Directly to Polyol | 7 | 26 | 1790 |

The above experiments illustrate the improved pellet strength and dispersion, and reduced compound viscosity, of the carbon black pellet compositions H and J of the present invention in comparison to use of carbon black compositions G and H pelletized with water only. The data also demonstrates the benefits of incorporating a binder directly onto the carbon black (pretreating the carbon black with a binder) in comparison to adding the binder to the polymer system.

This example is representative for polyurethane foam and sealant applications and demonstrates improvement in dispersion and rheology of the polymer compositons incorporating carbon black compositions of the present invention. The reduction in viscosity would allow use of low pressure to apply the polyurethane sealant in either automotive direct glazing or window double/triple glazing unit operations.

EXAMPLE 15–17

This example illustrates the advantages of using the carbon black compositions of the present invention in ink formulations.

Carbon black compositions G and H from Examples 11–14 were evaluated in a typical oil based gloss ink using the same process as outlined in examples 11–14. In this case the mill base and letdown system were an oil (McGee 47) and a heatset resin (Lawter Vehicle 3477) used in a ratio of 1:9 by weight. A third ink formulation was produced by adding sorbitan monooleate with 20 moles of ethylene oxide, to a composition of Carbon Black Composition G and the oil utilized in the compounding process.

The compounding operation involved pre-dispersion under a high shear, Dispermat, mixer for 5 minutes at a speed of 2000 rpm. The paste was then transferred to a triple roll mill for the final size reduction process. The number of passes through the triple roll mill required to generate zero scratches on a Hegman gauge were noted together with the residual background "sand" value. The paste was then diluted with further polyol to produce a 15% carbon black loaded sample and the viscosity measured on a Carri-Med CS viscometer at a shear rate of 300 s-1. The results were as shown in Table 4:

TABLE 4

Ink Formulation

| Carbon Black Pellet Composition | Number of passes triple roll | "sand" (microns) | viscosity shear stress (dyne/cm$^2$) |
|---|---|---|---|
| G | 5 | 18 | 330 |
| H | 4 | 15 | 165 |
| G, with binder added to oil | 4 | 17 | 240 |

These results demonstrate the improved dispersion and reduced viscosity obtained when the binder composition utilized in the carbon black compositions of the present invention is either incorporated onto the carbon black or with direct addition to the ink vehicle. Incorporating the binder onto the carbon black exhibits the most significant improvement. The binder would potentially help to reduce the mixing time for the ink and the reduced viscosity and improved dispersion would help to reduce wear in the application process.

EXAMPLE 18–26

Examples 18–26 illustrate the use of carbon black compositions of the present invention in semiconductive compounds.

Three carbon black pellet compositions, K, L and M were produced by combining a fluffy carbon black, identified herein as CB-5, having a DBP of 140 cc/100 g and a nitrogen surface area of 70 m$^2$/g, in a batch pin pelletizer together with a binder solution. The carbon black was combined with various binder solutions in a continuous pin pelletizer operating at 1050 rpm to provide wet pellets with levels of sorbitan monooleate with 20 moles ethylene oxide in amounts varying from 0 to 4%. The pellets were dried in a heated rotating drum to provide dry pellets with moisture content below 0.6%. The binder utilized in each pelleting composition was as shown in the Table below.

| Pellet Composition | Binder |
|---|---|
| K | water |
| L | 2% sorbitan monooleate 20 moles ethylene oxide |
| M | 4% sorbitan monooleate 20 moles ethylene oxide |

The carbon blacks were compounded into ethylene vinyl acetate resin (40% vinyl acetate content, melt index 3), using a twin screw extruder, to produce a 40% carbon black loaded compound. The compound was subsequently extruded to form a tape and the level of carbon black dispersion assessed by measuring the number and size of surface imperfections using an optical microscope (magnification 100×) with a reflected light source, by the procedures described herein. The results are shown below:

| EVA Composition Carbon Black Composition | area of un-dispersed carbon black |
|---|---|
| K | 0.0470% |
| L | 0.0056% |
| M | 0.0067% |

The reduction in undispersed carbon black would be seen in the final cable compound as an improvement in surface smoothness of the extruded cable. Reduction in surface imperfections of the semi-conductive insulation shield is known to reduce the frequency of electrical breakdown due to tree growth.

The EVA compositions containing carbon black compositions K and L disclosed above were evaluated for strippability onto a polyethylene substrate using the following technique: The compounds containing 40% carbon black in the ethylene vinyl acetate resin were compounded in a Brabender mixer with 1% dicumyl peroxide while maintaining the mixing temperature below 150° C. The material was transferred to a heated hydraulic press (temperature 130° C.) and a plaque 1.2 mm thick produced. A 2 mm polyethylene plaque containing 1% dicumyl peroxide was produced in a similar manner. The two plaques were laminated together under a pressure of 100 psi and exposed to a curing cycle of 180° C. for 15 minutes. The laminate was allow to cool to ambient temperature under pressure. The delamination force under a peeling angle of 180 degrees and a separation speed of 3.94 inches/minute was recorded; the results are an average of 28 peel tests:

| EVA Composition Carbon Black Composition | lb per 0.5 inch |
|---|---|
| K | 6.55 +/− 0.46 |
| L | 5.12 +/− 0.44 |

The data shows a reduction in strip force required to remove the semi-conductive shield compound from the insulation layer. This is important in cable splicing operations or in making terminal connections. The lower strip force will result in a faster operation and minimise voids/imperfections from high strip force systems and hence reduce the potential for electrical breakdown in use.

EXAMPLES 27–37

Examples 27–37 illustrate the use of carbon black compositions in polyolefin masterbatch compositions.

Four carbon blacks were utilized to produce carbon black compositions of the present invention and control carbon black compositions. The carbon blacks utilized are designated herein as CB-6, CB-7, CB-8 and CB-9 and had the combination of analytical properties set forth below:

| Carbon Black | DBP cc/100 g | N$_2$SA m$^2$/g |
|---|---|---|
| CB-6 | 140 | 68 |
| CB-7 | 135 | 180 |
| CB-8 | 136 | 120 |
| CB-9 | 168 | 53 |

The carbon blacks were were combined with either water or an aqueous solution of sorbitan monooleate with 20 moles of ethylene oxide in a continuous pelletizer operating with a rotor speed of 1000 rpm to produce wet pellets. The pellets were dried in an air circulating oven operating at 120° C. to produce dry pellets with moisture content below 0.4%. In all 11 different carbon black compositions were produced as shown below:

| Composition | Carbon Black | Binder |
|---|---|---|
| N | CB-6 | Water |
| O | CB-6 | 0.5% sorbitan monooleate with 20 moles ethylene oxide |
| P | CB-6 | 1.0% sorbitan monooleate with 20 moles ethylene oxide |
| Q | CB-6 | 2.0% sorbitan monooleate with 20 moles ethylene oxide |
| R | CB-6 | 4.0% sorbitan monooleate with 20 moles ethylene oxide |
| S | CB-7 | Water |
| T | CB-7 | 2.0% sorbitan monooleate with 20 moles ethylene oxide |
| U | CB-8 | Water |
| V | CB-8 | 2.0% sorbitan monooleate with 20 moles ethylene oxide |
| W | CB-9 | Water |
| X | CB-9 | 2.0% sorbitan monooleate with 20 moles ethylene oxide |

The carbon black compositions were assessed for pellet strength and attrition resistance using the procedures described herein. The results are shown below in Table 5.

TABLE 5

| | pellet strength | dust (%) | |
|---|---|---|---|
| Composition | (pounds) | 5' | 10' |
| N | 25 | 4.4 | 5.0 |
| O | 61 | 0.5 | 1.1 |
| P | 49 | 0.6 | 1.5 |
| Q | 55 | 0.2 | 0.4 |
| R | 50 | 0.8 | 0.6 |
| S | 44 | 3.6 | 15.0 |
| T | 83 | 0.3 | 1.5 |
| U | 62 | 0.8 | 5.2 |
| V | 119 | 0.2 | 0.4 |
| W | 17 | 2.5 | 4.8 |
| X | 21 | 1.2 | 2.4 |

Each of the carbon black compositions was identically compounded into low density polyethylene having a melt index of 26 using a Brabender mixer to produce a masterbatch containing 40% carbon black. The viscosity of the masterbatch was measured at 130° C. and a shear rate of 50 s-1. The results are set forth in Table 6 below.

TABLE 6

| Composition | Viscosity (Pa.s) |
|---|---|
| N | 5116 |
| O | 4045 |
| P | 3389 |
| Q | 2873 |
| R | 2536 |
| S | 4329 |
| T | 3695 |
| U | 4591 |
| V | 3804 |
| W | 5487 |
| X | 4373 |

The data in Table 6 illustrates the reduction in viscosity obtained by using a carbon black treated with a binder composition of the present invention. This reduction in viscosity would facilitate ease of dispersion of the masterbatch into further polyethylene in a typical extrusion blown film or profile extrusion application; and also improve output efficiency. One would also expect an improvement in carbon black dispersion which would also provide an improvement in pigmentary effieciency, UV protection and mechanical performance (e.g. tensile or impact strength).

EXAMPLES 38–49

This example illustrates the use of different binder compositions to produce carbon black compositions of the present invention, and the advantages of using the carbon black compositions of the present invention in ethyl vinyl acetate (EVA) applications.

Eleven carbon black compositions, HH, II, JJ, KK, LL, MM, NN, OO, PP, QQ and RR were produced by combining 400 g of a fluffy carbon black having a DBP of 128 cc /100 g and a nitrogen surface area of 68 m2/g, designated herein as CB-12, together with 8 g of binder dissolved in 500 g of water, in a batch pin pelletizer. The binder utilized in each composition was as follows:

| Composition | Binder |
|---|---|
| HH | water |
| II | sucrose monoester of tallow fatty acid |
| JJ | sucrose monostearate |
| KK | sucrose distearate |
| LL | ethoxylated glyceride |
| MM | ethoxylated triglyceride |
| NN | SYNPERONIC PE/L61 surfactant |
| OO | SYNPERONIC PE/85 surfactant |
| PP | SYNPERONIC PE/F127E surfactant |
| QQ | SYNPERONIC PE/38E surfactant |
| RR | SYNPERONIC PE/108E surfactant |

*SYNPERONIC is a trade name for surfactants produced and sold by ICI Corporation and comprise ethylene oxide - propylene oxide copolymers.

The mix was agitated at 800 rpm for 2 minutes to produce a pelletized carbon black. The carbon black pellets were dried at 125° C. until the moisture content was below 1%.

Mass pellet strength of the carbon black compositions was determined according to the procedures described herein. The results are set forth in Table 7 below.

Each of the carbon black compositions was combined with an ethylene vinyl acetate copolymer containing 40% vinyl acetate and a melt index of 3 in a Brabender mixer conditioned at 65° C. The compound was masticated for 6 minutes at 50 rpm to produce a fully dispersed compound containing 40% carbon black. These compounds were assessed for melt index (MI) at 190° C. using a 21.6 kg load, according to the procedures described herein. The results are also set forth in Table 9 below, which also shows the HLB of each binder.

TABLE 7

| Comp | Binder | HLB | MPS (pounds) | MI (g/10 m) | Disp. Of Dil. Samples |
|---|---|---|---|---|---|
| HH | water | | 1.6 | 6.58 | 2C |
| II | sucrose monoester of tallow fatty acid | 14.5 | 15.2 | 9.86 | 1C |
| JJ | sucrose monostearate | 15.0 | 15.8 | 6.88 | 1B |
| KK | sucrose distearate | 12.0 | 22.8 | 9.18 | 1B |
| LL | ethoxylate glyceride | 15.7 | 4.9 | 8.84 | 1C |
| MM | ethoxylated | 14.4 | 6.7 | 14.00 | 1D |

TABLE 7-continued

| Comp | Binder | HLB | MPS (pounds) | MI (g/10 m) | Disp. Of Dil. Samples |
|---|---|---|---|---|---|
| NN | triglyceride SYNPERONIC PE/L61 surfactant | 16.0 | 9.4 | 10.34 | 1B |
| OO | SYNPERONIC PE/85 surfactant | 16.0 | 2.9 | 10.55 | 1C |
| PP | SYNPERONIC PE/F127E surfactant | 22.0 | 2.6 | 6.70 | 1E |
| QQ | SYNPERONIC PE/38E surfactant | 30.5 | 3.1 | 7.90 | 1B |
| RR | SYNPERONIC PE/108E surfactant | 27.0 | 3.5 | 7.97 | 1E |

Comp. = Composition; Disp. Of Dil. Samples = Dispersion of Diluted Samples.

These examples illustrate the improvement in dispersion quality and reduction in viscosity with improved pellet handling qualities, in a commercial system. These results would relate to shorter mixing cycles and improved extrusion characteristics.

EXAMPLES 50–52

These examples illustrates the production of carbon black compositions of the present invention, and the advantages of using the carbon black compositions of the present invention in ethyl vinyl acetate (EVA) applications.

Three carbon black compositions, SS, TT and UU were produced by combining a fluffy carbon black with a nitrogen surface area of 70 m2/g and a DBP of 140 cc/100 g of carbon black, designated herein as CB-13, with a binder solution containing sorbitan monooleate in a continuous pin pelletiser operating at 1050 rpm to provide wet pellets. The resulting pellets containing either 0%, 2% or 4% binder were dried in a heated rotating drum to provide dry pellets with moisture contents below 0.6%. The percentage of the binder utilized in each composition was as follows:

| Composition | Binder (% by weight) |
|---|---|
| SS | 0.0% sorbitan monooleate (water) |
| TT | 2% sorbitan monooleate |
| UU | 2% sorbitan monooleate |

The treated carbon blacks where compounded into various polymers using a Brabender mixer operating at 50 rpm and with an initial chamber temperature of 85° C. The mixing cycle time was 6 minutes. The compounds were assessed for melt viscosity at 130° C. and a shear rate of 50s-1.

| | Viscosity (Pa.s) percent binder | | |
|---|---|---|---|
| polymer | 0 | 2 | 4 |
| ethylene vinyl acetate (40% vinyl acetate, MI 3.0) | 8155 | 3210 | 3080 |
| ethylene vinyl acetate (18% vinyl acetate, MI 2.5) | 7368 | 3564 | 3498 |
| ethylene ethyl acrylate (18% ethylacrylate, MI 6.0) | 7018 | 3170 | 2558 |

The data illustrates a significant reduction in melt viscosity when using the designated binder, this would reflect in a reduction in die head pressure during the cable fabrication process. Visually this would be seen as an improvement is smoothness of the compound extrudate and also an increase in output rate.

The polymers utilized represent typical types of polymer used in wire and cable formulations used for conductor and semi-conductive shield applications. The polymers containing either 18% vinyl acetate or ethyl acrylate are typically used in conductor or bonded semi-conductive shield applications while the polymer containing 40% vinyl acetate is more suitable for a strippable semi-conductive shield type product.

It should be clearly understood that the forms of the present invention herein described are illustrative only and are not intended to limit the scope of the invention.

I claim:

1. A carbon black composition comprising:
   carbon black and 0.1% to 50%, by weight, of at least one binder comprising an ethoxylated polyhydric alcohol having at least 3 hydroxyl groups per molecule prior to ethoxylation where the total number of ethylene oxide molecules per polyhydric alcohol is at least 3.

2. A carbon black composition comprising:
   carbon black and 0.1% to 50%, by weight, of at least one binder comprising an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further whether the number of ethylene oxide molecules per polyhydric alcohol ester is at least 3.

3. A carbon black composition comprising:
   carbon black and 0.1% to 50%, by weight, of at least one binder comprising an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality.

4. A carbon black composition comprising:
   carbon black and 0.1% to 50%, by weight, of at least one binder comprising an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol is at least 3.

5. A carbon black composition comprising:
   carbon black and 0.1% to 50%, by weight, of at least one binder selected from at least one of the following groups:
   i) an ethoxylated polyhydric alcohol having at least 3 hydroxyl groups per molecule prior to ethoxylation where the total number of ethylene oxide molecules per polyhydric alcohol is at least 3;
   ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further whether the number of ethylene oxide molecules per polyhydric alcohol ester is at least 3;

iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality; and iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol is at least 3.

6. The carbon black composition of claim 5 wherein the polyhydric alcohol comprises triethanolamine, glycerol, pentaerythritol, sorbitol, sorbitan, sucrose or polyglyceride.

7. The carbon black composition of claim 5 wherein the binder has an HLB value from 8.0 to 30.

8. The carbon black composition of claim 5 wherein the binder is selected from group i).

9. The carbon black composition of claim 5 wherein the binder is selected from group ii).

10. The carbon black composition of claim 5 wherein the binder is selected from group iii).

11. The carbon black composition of claim 5 wherein the binder is selected from group iv).

12. The carbon black composition of claim 5 wherein the binder is present in an amount of 1.0 to 20 percent by weight.

13. The carbon black composition of claim 5 wherein the total number of ethylene oxide molecules per polyhydric alcohol of the binder varies from 3 to 500.

14. The carbon black composition of claim 5 wherein the total number of ethylene oxide molecules per polyhydric alcohol of the binder varies from 5 to 100.

15. The carbon black composition of claim 5 wherein the carbon black is treated with the binder.

16. A carbon black composition comprising:

carbon black and 0.1% to 50%, by weight, of at least one binder having an HLB value from 8.0 to 30 selected from at least one of the following groups:

i) an ethoxylated polyhydric alcohol having at least 3 hydroxyl groups per molecule prior to ethoxylation where the total number of ethylene oxide molecules per polyhydric alcohol is at least 3;

ii) an alkyl carboxylic acid ester of an ethoxylated polyhydric alcohol having at least 3 hydroxyl groups per molecule prior to ethoxylation, where the alkyl carboxylic acid has from 8 to 30 carbon atoms, and may be saturated or unsaturated, and further where the mono-ester functionality is at least 80% with the remainder being a di-ester functionality, and further whether the number of ethylene oxide molecules per polyhydric alcohol ester is at least 3;

iii) an alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality; and iv) an ethoxylated alkyl carboxylic acid ester of a polyhydric alcohol having at least 3 hydroxyl groups per molecule prior to esterification, where the alkyl carboxylic acid has from 8 to 30 carbon atoms, and may be saturated or unsaturated, and further where the mono-ester functionality is at least 80% with the remainder being a di-ester functionality, and further where the number of ethylene oxide molecules per polyhydric alcohol is at least 3.

17. The carbon black composition of claim 16 wherein the polyhydric alcohol comprises triethanolamine, glycerol, pentaerythritol, sorbitol, sorbitan, sucrose or polyglyceride.

18. The carbon black composition of claim 16 wherein the binder is selected from group i).

19. The carbon black composition of claim 16 wherein the binder is selected from group ii).

20. The carbon black composition of claim 16 wherein the binder is selected from group iii).

21. The carbon black composition of claim 16 wherein the binder is selected from group iv).

22. The carbon black composition of claim 16 wherein the binder is present in an amount of 1.0 to 20 percent by weight.

23. The carbon black composition of claim 16 wherein the total number of ethylene oxide molecules per polyhydric alcohol of the binder varies from 3 to 500.

24. The carbon black composition of claim 16 wherein the total number of ethylene oxide molecules per polyhydric alcohol of the binder varies from 5 to 100.

25. The carbon black composition of claim 16 wherein the carbon black is treated with the binder.

* * * * *